US008956219B2

(12) United States Patent
Soukup et al.

(10) Patent No.: US 8,956,219 B2
(45) Date of Patent: Feb. 17, 2015

(54) SYSTEM AND METHOD FOR AWARDING AN INCENTIVE AWARD

(75) Inventors: Thomas E. Soukup, Las Vegas, NV (US); Jeffrey George, Las Vegas, NV (US); Steve Sutherland, Henderson, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 1772 days.

(21) Appl. No.: 11/066,069

(22) Filed: Feb. 25, 2005

(65) Prior Publication Data

US 2006/0058099 A1 Mar. 16, 2006

Related U.S. Application Data

(60) Provisional application No. 60/608,519, filed on Sep. 9, 2004.

(51) Int. Cl.

*G06F 17/00* (2006.01)
*G06F 19/00* (2011.01)
*G07F 17/32* (2006.01)

(52) U.S. Cl.

CPC .................................... *G07F 17/32* (2013.01)
USPC .................... 463/25; 463/16; 463/20; 463/42

(58) Field of Classification Search

USPC ........ 463/25, 1, 10–13, 16–20, 29–31, 40–43
See application file for complete search history.

(56) References Cited

U.S. PATENT DOCUMENTS

| | | | | |
|---|---|---|---|---|
| 6,003,013 | A | 12/1999 | Boushy et al. | |
| 6,631,904 | B1 * | 10/2003 | Lennox et al. | 273/236 |
| 6,699,124 | B2 | 3/2004 | Suchocki | |
| 6,722,985 | B2 | 4/2004 | Criss-Puszkiewicz et al. | |
| 7,682,244 | B1 * | 3/2010 | Luciano et al. | 463/25 |
| 2001/0025253 | A1 * | 9/2001 | Heintz et al. | 705/14 |
| 2002/0119824 | A1 | 8/2002 | Allen | |
| 2003/0036425 | A1 * | 2/2003 | Kaminkow et al. | 463/25 |
| 2004/0072618 | A1 | 4/2004 | Bartholomew et al. | |
| 2004/0133474 | A1 * | 7/2004 | Tami et al. | 705/16 |
| 2004/0198487 | A1 * | 10/2004 | Schneider | 463/20 |
| 2004/0259632 | A1 * | 12/2004 | Crittenden et al. | 463/25 |
| 2005/0059480 | A1 * | 3/2005 | Soukup et al. | 463/25 |
| 2005/0060231 | A1 * | 3/2005 | Soukup et al. | 705/14 |

FOREIGN PATENT DOCUMENTS

EP 0961213 A2 12/1999

* cited by examiner

*Primary Examiner* — Milap Shah

(74) *Attorney, Agent, or Firm* — Howard & Howard Attorneys PLLC

(57) ABSTRACT

System and system award a player of a gaming machine an incentive award. The gaming machine has first and second playable games. A computer is connected to the machine. The player chooses to play one of the first and second games and play on the gaming machine is tracked. The incentive award is awarded as a function of the tracked play on the gaming machine and a set of predetermined award criteria.

71 Claims, 3 Drawing Sheets

SYSTEM AND METHOD FOR AWARDING AN INCENTIVE AWARD

CROSS-REFERENCE TO RELATED APPLICATIONS

The present application claims priority to U.S. Provisional Application Ser. No. 60/608,519, filed Sep. 9, 2004, which is incorporated herein by reference.

FIELD OF THE INVENTION

The present invention relates generally to gaming machines, and more particularly, to a system and method for providing awarding an incentive award based on play.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

One area that has received a lot of attention in recent years has been providing added incentives to players of electronic gaming machines, such as video slot machines video poker machines.

One type of award may be selected at random or be based on a player's previous level of play. Once a player has met the selected criteria, the award in credits paid from the machine's hopper is released.

Players may also be given an incentive through a player tracking club. Usually, a player is identified during play by a player tracking ID card and/or a player identification number (PIN). The player tracking system tracks the player's play and awards player tracking points according to established criteria. The player tracking points may be redeemed for prizes, such as complimentary meals or merchandise.

However, these systems are inflexible and do not provide the casino operator with the maximum benefit and advantages available from the information and systems now available.

The present invention is aimed at one or more of the problems as set forth above.

SUMMARY OF THE INVENTION AND ADVANTAGES

In a first aspect of the present invention, a method for awarding a player of a gaming machine an incentive award is provided. The gaming machine has first and second playable games. The player has a player account stored in a computer connected to the machine. The method includes the steps of allowing the player to play one of the first and second games, tracking play on the gaming machine, and responsively awarding the incentive award as a function of the tracked play on the gaming machine and a set of predetermined award criteria.

In a second aspect of the present invention, a method for awarding a player of at least one of first and second gaming machines an incentive award is provided. The first and second gaming machines have first and second playable games. The player has a player account stored in a computer connected to the first and second gaming machines. The method includes the steps of tracking play by the player of the first game on the first gaming machine, tracking play by the player of the second game on the first gaming machine, tracking play by the player of the first game on the second gaming machine, and tracking play by the player of the second game on the second gaming machine. The method also includes the step of responsively awarding the incentive award to the player as a function of the tracked play on the first and second gaming machines and a set of predetermined award criteria.

In a third aspect of the present invention, a system for awarding a player an incentive award is provided. The system includes a gaming machine, a computer and a database. The gaming machine is playable by the player and has first and second playable games. The computer is coupled to the machine for tracking a player account. The database, on the computer, stores player account data in the player account. The computer tracks play by the player on the first gaming machine and awards the inventive award as a function of the tracked play on the gaming machine and a set of predetermined award criteria.

In a fourth aspect of the present invention, a system for awarding an incentive award is provided. The system includes first and second gaming machines, a computer and a database. The first gaming machine is playable by the player and has first and second playable games. The second gaming machine is playable by the player and has first and second playable games. The computer is coupled to the gaming machines for tracking a player account. The database stores player account data in the player account. The computer tracks play by the player of the first game on the first gaming machine, tracks play by the player of the second game on the first gaming machine, tracks play by the player of the first game on the second gaming machine, and tracks play by the player of the second game on the second gaming machine. The computer responsively awards the incentive award to the player as a function of the tracked play on the first and second gaming machines and a set of predetermined award criteria.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

With reference to the drawings and in operation, the present invention provides a system 10 and method for awarding an incentive award to a player 24 of a gaming machine or machines 12. Generally, the gaming machines 12 may accept wagers (see below), play a game, and award the player 24 a jackpot based on associated rules and paytable(s) for the gaming machine.

Figure 1:
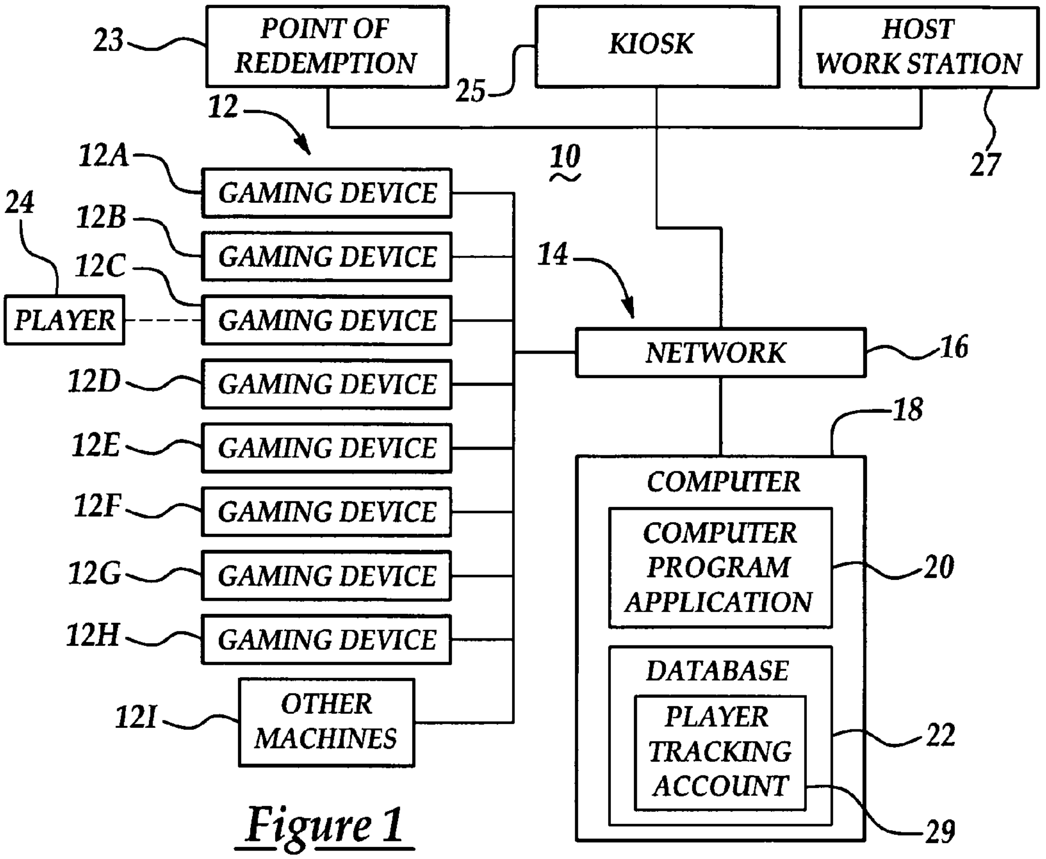
FIG. 1 is block diagram of a system for providing credit to a player of a gaming machine, according to an embodiment of the present invention.

In one embodiment, the system 10 and method 60, 70, 80 may be embodied or implemented via an entertaining management and monitoring system 14 which is shown in block diagram form in FIG. 1. The entertainment and monitoring system 14 may include many additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT). Two such systems are disclosed in U.S. patent application Ser. No. 09/967,571, filed Sep. 28, 2001, and U.S. Provisional Application Ser. No. 60/502,179, filed Sep. 11, 2003, both of which are hereby incorporated by reference.

The entertainment and monitoring system 14 also tracks data related to the play of the gaming machines 12.

As shown, the system 10 includes a plurality of gaming machines 12. Machines 12 may include, but are not limited to gaming machines, electronic gaming machines (such as video slot, video poker machines, or video arcade games), electric gaming machines, virtual gaming machines, e.g., for online gaming, and an interface to a table management system (not shown) for table games, or other suitable devices at which a user may interact or access a user or player account. In the illustrated embodiment, eight electronic machines EGM) 12A-12H are shown. However, it should be noted that the present invention is not limited to any number or type of machines 12. In one embodiment, the machines 12 are organized into banks (not shown), each bank containing a plurality of machines 12.

Other types of machines which may be included, such as kiosks 25, point of sale or redemption terminals 23, are indicated with reference number 12I.

The gaming machines 12 are connected via a network 16 to one or more host computers 18, which are generally located at a remote or central location. The computer 18 includes a computer program application 20 which maintains one or more databases 22. In one embodiment, the database(s) are Oracle database(s).

The computer program application 20 and databases 22 may be used to record, track, and report accounting information regarding the gaming machines 12 and players of the gaming machines 12. Additionally, the computer program application 20 and databases 22 may be used to maintain information related to player or player tracking accounts (see below).

In general, the machines 12 may be used by a user or player, i.e., to access their player account. For example, a gaming machine 12C is playable by a player 24. The player 24 may select one of the gaming machines 12C to play and insert a coin, credit, coupon, and/or player tracking card (not shown) into the chosen EGM 12C. Generally, the gaming machines 12C have an associated number of credits or coins required in order to play. In the case of video slot or poker games, the game is played and an award in the form of credits may be awarded based on a pay table of the gaming machine 12.

Figure 2:
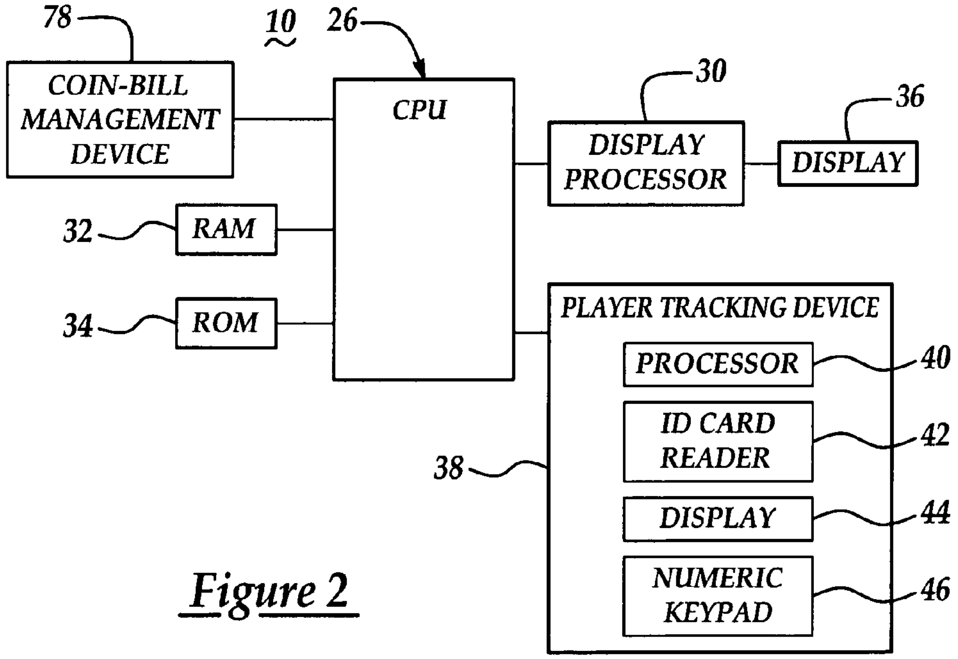
FIG. 2 is a block diagram of a gaming machine for use with the system of FIG. 1.

With reference to FIG. 2, a block diagram of a suitable electronic gaming machine 12C is shown.

The gaming machine 12C comprises a game controller 26, or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the gaming machine 12C, such as the booting operation thereof, game code and graphics.

Input to the gaming machine 12C may be accomplished via mechanical switches or buttons or via a touchscreen interface (not shown). Such gaming machines 12 are well known in the art and are therefore not further discussed.

The player 24 is identified via the player tracking card and/or a player identification number entered into player tracking device 38 at each EGM 12 (see below). Player tracking accounts may be used, generally, to provide bonuses to a player, in addition to the award designated by, in the case of a video slot or poker machine, the EGM's 12 paytable. These bonuses may be awarded to the player 24 based a set of criteria, including, but not limited to, a) the player's play on the gaming machine 12C, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game 12. Bonuses may also be awarded in a discretionary manner or based on other criteria, such as, purchases made at a gift shop or other affiliated location.

In one embodiment, the player tracking device 38 includes a processor 40, a player identification card reader 42 and/or a numeric keypad 44, and a display 46. In one embodiment, the display 46 is a touchscreen panel and the numeric keypad 44 is implemented thereon.

The player 24 may be identified by entry of a player tracking card into the player identification card reader 42 and/or entry of a player identification number (PIN) on the numeric key pad 46. The play tracking device 38 may also be used to communicate information between the computer 18 and the corresponding EGM 12C. The player tracking device 40 may also be used to track bonus points, i.e., incentive points or credits, downloaded from the computer 18.

In one aspect of the present invention, the bonuses are awarded as bonus points. In one embodiment, the bonus points are incentive points. Incentive points may be traded or used in exchange for gifts and/or services, such as hats, t-shirts, meals, etc. . . . . In another embodiment, the bonus points may be converted to credits. In another aspect, the a bonus may be a voucher for a specific gifts and/or service. The voucher may have a corresponding number of bonus points.

The incentive points may converted to credits using a predetermined ratio. The predetermined ratio may be 1 or any other desired ratio. The predetermined ratio may also be varied based on determined criteria, e.g., the gaming machine 12 being played, the player, or the time of day. Incentive points may be designated as cashable or non-cashable. As described below, the incentive points in a player account may be downloaded to one of the gaming machines 12 for play.

Bonus points stored in the player account, which may be convertible to credits, may be designated as cashable or non-cashable. In one embodiment, the player account may include only cashable incentive points. In another embodiment, the player account may include only non-cashable incentive points. In a third embodiment, the player account may include both cashable and non-cashable incentive points.

In still another embodiment, the player account may include incentive points, cashable and/or non-cashable, and credits, cashable and/or non-cashable.

Cashable credits, or incentive points converted into credits, may be downloaded to an EGM 12. When the player has finished playing the EGM 12, any remaining credits may be cashed out, i.e., retrieved as coins or placed on a printed ticket or player tracking card for redemption or play on another gaming machine 12.

Non-cashable credits must be played. When the player stops playing an EGM 12C, any remaining non-cashable credits which were downloaded to the EGM 12C are either lost or uploaded back to the player account (see below).

Systems and methods for awarding, downloading, and using incentive awards are disclosed in U.S. patent application Ser. No. 10/661,198, entitled "SYSTEM AND METHOD FOR CREDITING A PLAYER OF A GAMING MACHINE", filed on Sep. 12, 2003, U.S. patent application Ser. No. 10/938,677, entitled "A SYSTEM AND METHOD FOR AWARDING INCENTIVE AWARDS TO A PLAYER OF A GAMING DEVICE", filed on Sep. 10, 2004 U.S. patent application Ser. No. 10/938,187, entitled "GAMING INCENTIVE SYSTEM AND METHOD OF REDEEMING BONUS POINTS", filed on Sep. 10, 2004, all of which are herein incorporated by reference.

One or more of the gaming machines 12 may be capable of playing more than one game. Such gaming machines 12 may be referred to as multi-game gaming machines 12. In other words, a particular gaming machine 12 may be capable of playing more than one type or version of game.

In one example, a gaming machine 12 may implement a video slot machine game. The player 24 may wager a credit or number of credits on each payline in the video slot machine game. Typically, each credit has an associated cost or monetary amount, e.g., 1 cent, one dollar, or five dollar. The gaming machine 12 may be configurable such that the associated cost of a credit is set to one of a plurality of amounts.

In one embodiment, the cost of a credit is pre-set, e.g., by an employee of the casino. The cost of the credit may also be changed. In an alternative embodiment, the associated cost of a credit may be determined by the player 24. In other words, the player 24 may decide whether to play the gaming machine 12 as, e.g., penny-slot, $1 slot or $5 slot.

In another example, a gaming machine 12 may be configurable to play different versions of the same game or different games. For example, the gaming machine 12 may be configurable to play different versions of the same game at different times of the time, or as configured by an employee of the casino. In another example, the gaming machine 12 may be configurable to play completely different games, e.g., a video slot game and/or video poker and/or video blackjack.

In still another example, the first and second games may be played under different set of rules, e.g., different paylines and/or have different paytables.

As discussed above, the entertainment and monitoring system 14 tracks data related to the play of the gaming machines 12. For example, the system 14 tracks (through the player ID Card), data related to the play of the gaming machines 12 by a player 24. Typically, any data which is stored and recorded by the gaming machine 12, plus any other desired or required information, may be tracked and stored by the system 14. Data which may be tracked on a player basis include, but is not limited to, credits in or played, credits out, credits won, etc. . . . .

In one aspect of the present invention, the data or "meters" tracked by the system 14 are tracked on a gaming machine 12 basis, as well as a game basis in a multi-game environment. For example, if one or more of the gaming machines 12 are multi-games machines, then the meters or tracked data are recorded or tracked based on which "game" on the multi-game machines 12, the player 24 played.

In one aspect of the present invention, the system 10 awards a pre-determined incentive award based on the player's play of the gaming machine(s) 12. The pre-determined incentive award has an associated set of predetermined criteria.

In one aspect of the present invention, the award criteria are fully configurable and definable through the computer 18. Typically, an authorized user of the casino has the ability to access the computer 18 and define or modify an incentive award.

In a multi-game gaming machine environment, in which one or more of the gaming machines 12 are capable of playing more than one game and the entertainment and monitoring system 14 tracks game data on a game basis, the predetermined award criteria may also be based on game basis.

For example, the award criteria may include, but is not limited to, criteria based on the game played, a number of bonus points associated with or assigned to the player's player account and a level of play on one or more of the games of a multi-game gaming machine 12.

In one aspect of the present invention, the award criteria may include criteria based on one criteria or a combination of award criteria.

In one embodiment, one award criteria may be the play of one of the games of a multi-game gaming machine 12. In other words, an incentive award may be awarded to the player's player account if the player plays a predetermined game on a multi-game gaming machine 12.

In another embodiment, one award criteria may be the player has played to a predetermined level of play, i.e., a triggering level of play, of a predetermined game on a multi-game gaming machine 12. The award criteria may be defined such that the triggering level of play may be aggregated, i.e., the player may meet the award criteria through playing the predetermined game on one or a plurality of gaming machines 12, all of which offer the predetermined game.

The award criteria may also be limited in time, i.e., active for a predetermined time period.

Other award criteria may also be also be set. For example, the set of award criteria may require that the number of bonus points in the player's account must be (1) less than, (2) less than or equal, (3) greater than, or (4) greater than or equal to a bonus triggering amount.

Figure 3:
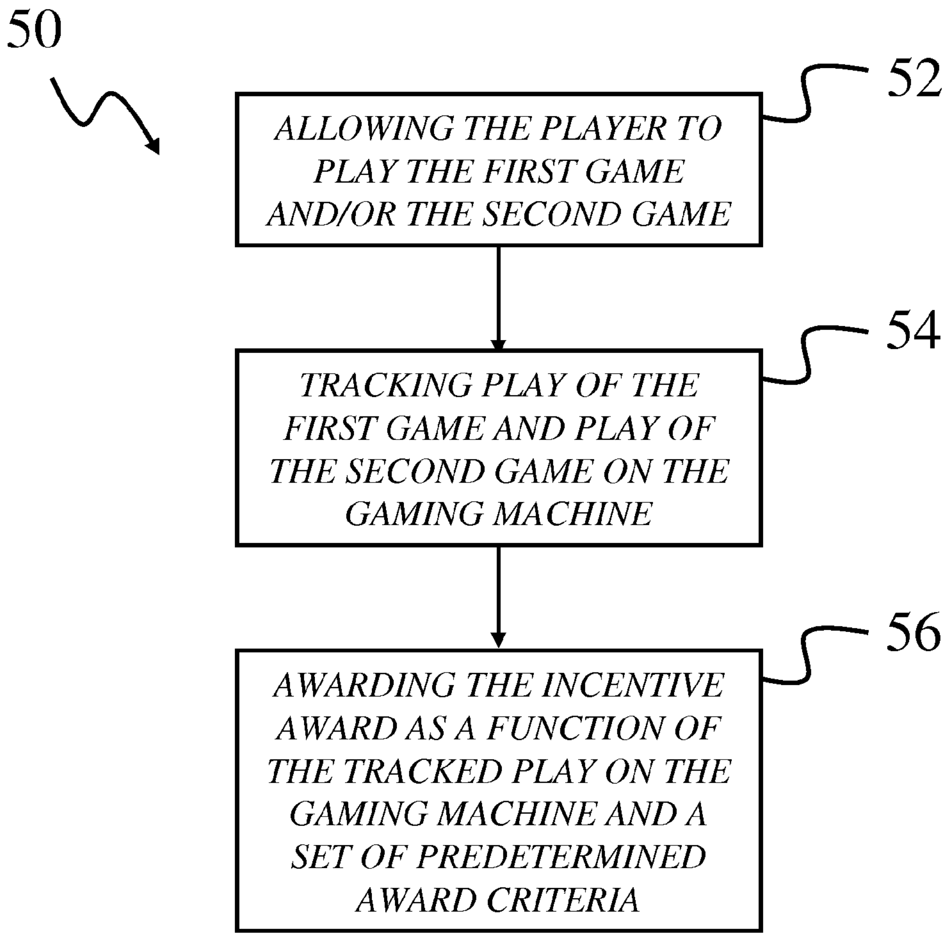
FIG. 3 is a flow diagram of a method for awarding an incentive award, according to a first embodiment of the present invention; and, FIG. 4 is a flow diagram of a method for awarding an incentive award, according to a second embodiment of the present invention.

The system 10 allows any number or type of criteria to be combined with an award criteria based on a multi-game scenario to establish the predetermined award criteria. With specific reference to FIG. 3, a method 50 for awarding a player 24 of a gaming machine 12 an incentive award, according to one embodiment of the present invention is shown.

For discussion purposes only, the gaming machine 12 has first and second playable games, although the method 50 is not limited to a gaming machine 12 having only two games.

In a first step 52, the player 24 may play one of the first and second games. As discussed above, in one embodiment, which of the first and second games is playable at any given time may be pre-set, i.e., set by an employee or the casino. Alternatively, which games is available may be automatically set by a set of predetermined criteria, such as the time of time. In another embodiment, the player 24 may have the option of which of the first and second games to play.

In a second step 54, the play of the gaming machine 12 is tracked. In one embodiment, which game of the first and second games being played is tracked and recorded. In another embodiment, other data regarding the player of the game, such as, credits in and credits won, may be tracked.

In a third step 56, the incentive award is awarded if the tracked play meets a set of predetermined award criteria.

For example, in one embodiment the game played by the player 24 may be tracked. The award criteria may include a pre-selected one of the first and second games. In order to be awarded the incentive award, the player 24 must play the pre-selected one of the first and second games.

Additionally, the award criteria may include a bonus triggering amount. As discussed above, the player's player account may include an associated number of bonus points. In order to be award the incentive award, the award criteria may require that the may require that the number of bonus points associated with the player's player account have a predetermined relationship with a bonus triggering amount. In one aspect of the present invention, the predetermined relationship is one of the number of bonus points in the player account being: (a) less than, (b) less than or equal to, (c) greater than; (d) greater than or equal to; or (e) equal to the bonus triggering amount.

In another aspect of the present invention, the award criteria may be based on a level of play of one or more of the first and second games. As discussed above, the level of play of one or both of the first and second games may be tracked. The level of play may be tracked, e.g., based on a number of credits wagered, the cash equivalent wagered, or some other suitable measurement.

In one aspect, the award criteria may include criteria based on the level of play of one or both of the first and second games. For example, the incentive award may required that the level of play on at least one of the first and second games has a predetermined relationship with a triggering level of play. In one aspect, the predetermined level of play on the at least one of the first and second games is (a) less than, (b) less than or equal to, (c) greater than; (d) greater than or equal to; or (e) equal to the triggering level of play.

In one embodiment, the award criteria may include criteria related to only one of the first and second games or both of the first and second award criteria.

For example, the player 24 may be awarded the incentive award if the player 24 plays a designated one of the first and second games (or reaches an associated triggering level of play). Or the player may be awarded the incentive award if the player 24 plays both of the first and second games (or reaches an associated triggering level of play for each game).

As stated above, the set of award criteria may include a single criteria or a combination of criteria in which all or a subset must be met in order for the player 24 to be awarded the incentive award.

Figure 4:
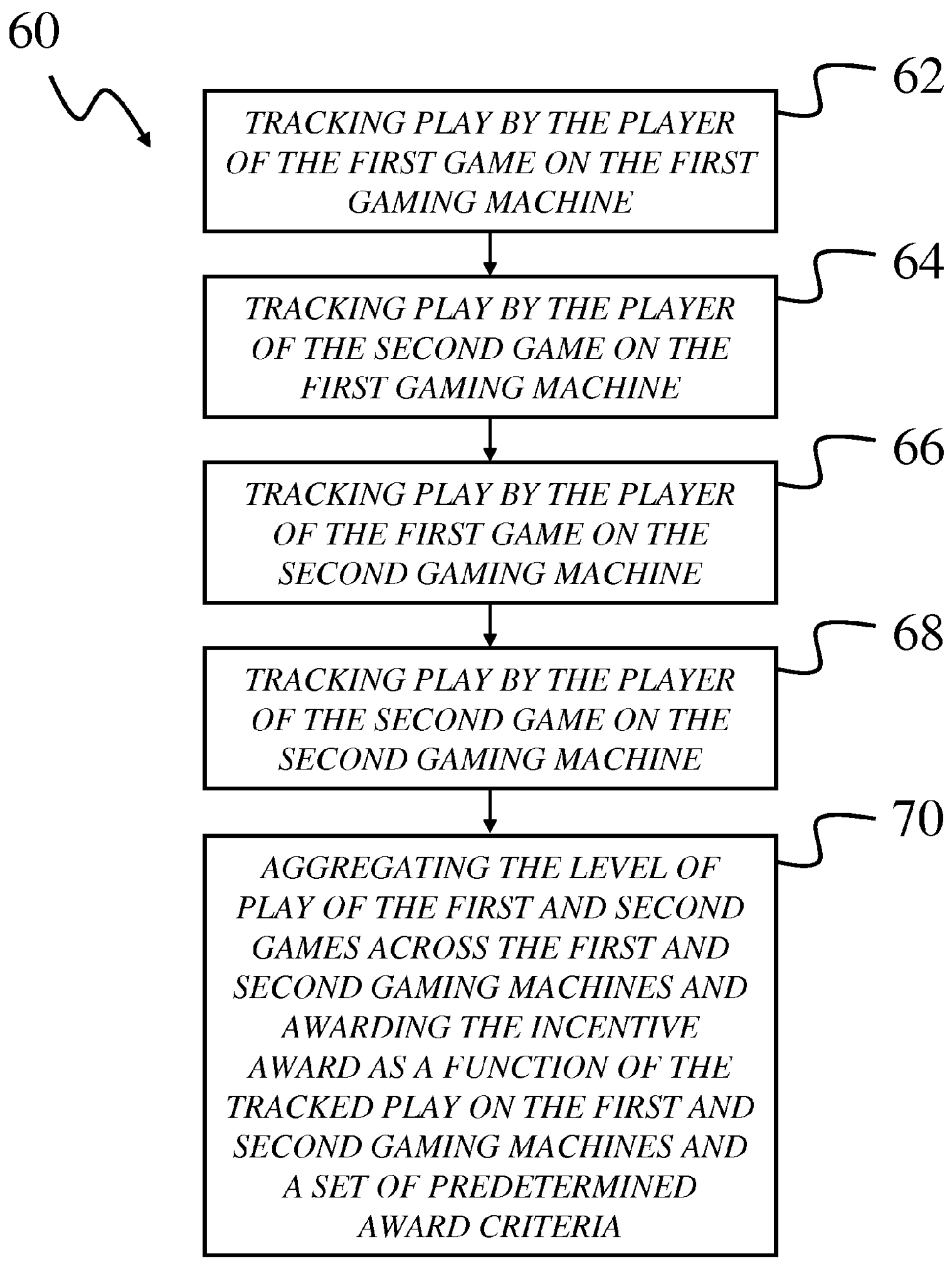

With specific reference to FIG. 4, a method 60 for awarding an incentive award to a player 24 according to another embodiment of the present invention is shown. The player 24 may play on one of first and second gaming machines 12. Each gaming machine 12 has first and second games playable by the player 24. In one aspect the first game on the first gaming machine 12 and the first game on the second gaming machine 12 are the same. However, it is not necessary for the first games to be the same. In one aspect the second game on the first gaming machine 12 and the second game on the second gaming machine 12 are the same. However, it is not necessary for the second games to be the same.

In a first step 62, play, if any, by the player 24 of the first game on the first gaming machine 12 is tracked. In a second step 64, play, if any, by the player 24 of the second game on the first gaming machine 12 is tracked. In a third step 66, play by the player 24, if any, of the first game on the second gaming machine 12 is tracked. In a fourth step 68, play by the player, if any, of the second game on the second gaming machine 12 is tracked. In a fifth step 70, the incentive award is awarded to the player 24 as a function of the tracked play on the first and second gaming machines and a set of predetermined award criteria.

As discussed above, the predetermined award criteria may include one or more of the following: the play of one of the first and second games, a certain level of play, i.e., a triggering level of play, of one of the first and second games, and a bonus triggering amount. The triggering level of play may be met, in one embodiment, by aggregate play across the first and second gaming machines 12. The triggering level of play and the bonus triggering amount, as well as the other award criteria may be set up or defined by an employee or employees of the casino.

Obviously, many modifications and variations of the present invention are possible in light of the above teachings. The invention may be practiced otherwise than as specifically described within the scope of the appended claims.

What is claimed is:

1. A method for awarding a player of a gaming machine an incentive award, the gaming machine including a game controller coupled to a memory device having a plurality of games including first and second playable games being stored on the memory device, the gaming machine configured to receive a wager from the player, determine an outcome of a game, and provide a jackpot award to the player as a function of the received wager, a paytable, and the generated outcome, the player having a player account stored in a host computer connected to the gaming machine, the host computer including a processor coupled to a database, the player account being stored on the database and including a number of bonus points, including the steps of:

accepting a wager from the player to play either of the first and second games, via the gaming machine;

establishing, by the host computer processor, a first triggering level of play associated with the first game, the first triggering level of play including a first predetermined amount of credits wagered on the first game;

establishing, by the host computer processor, a second triggering level of play associated with the second game, the second triggering level of play including a second predetermined amount of credits wagered on the second game, the second predetermined amount of credits being different from the first predetermined amount of credits;

allowing the player to play the first game on the gaming machine during a first playing session;

tracking, by the host computer processor, play of the first game on the gaming machine during the first playing session and storing the tracked level of play of the first game in the database;

allowing the player to play the second game on the gaming machine during a second playing session that occurs after the first playing session;

tracking, by the host computer processor, play of the second game on the gaming machine during the second playing session and storing the tracked level of play of the second game in the database;

determining, by the host computer processor, if the tracked level of play of the first game meets the first triggering level within a predetermined period of time;

determining, by the host computer processor, if the tracked level of play of the second game meets the second triggering level; and, responsively awarding, by the host computer processor, the incentive award if:

(a) the tracked level of play of the first game meets the first triggering level within the predetermined period of time, (b) the tracked level of play of the second game meets the second triggering level, and (c) the number of bonus points included in the player account is less than a predefined number of bonus points;

wherein the incentive award includes an amount of bonus points for use in placing a wager on a subsequent play of either of the first and second games.

2. A method, as set forth in claim 1, wherein the plurality of games includes a pre-selected game, the method including the step of awarding the incentive award if the first playable game is the pre-selected game.

3. A method, as set forth in claim 1, including the step of awarding the incentive award if the tracked level of play of the second game meets the second triggering level within the second predetermined period of time.

4. A method, as set forth in claim 1, including the steps of:

assigning the bonus points to a voucher; and assigning the voucher to the player account.

5. A method, as set forth in claim 1, wherein the bonus points are incentive points.

6. A method, as set forth in claim 1, wherein the bonus points are credits.

7. A method, as set forth in claim 1, wherein the bonus points may be converted to credits for use in placing a wager at the gaming machine.

8. A method, as set forth in claim 1, wherein the incentive award may be redeemed for gifts and/or services.

9. A method, as set forth in claim 1, wherein the incentive award is associated with an electronic voucher assigned to the player account.

10. A method, as set forth in claim 1, wherein the first game is played according to a first set of rules and the second game is played according to a second set of rules.

11. A method, as set forth in claim 1, wherein the first game is a different type of game than the second game.

12. A method, as set forth in claim 11, wherein the wager is in the form of credits.

13. A method, as set forth in claim 12, wherein credits have an associated first cost in the first game and an associated second cost in the second game.

14. A method for awarding a player of first and second gaming machines an incentive award, the first and second gaming machines each including a game controller and a memory device having a plurality of games including first and second playable games being stored on the corresponding memory devices, each of the first and second gaming machines configured to receive a wager from the player, determine an outcome of a game, and provide a jackpot award to the player as a function of the received wager, a paytable, and the generated outcome, the player having a player account stored in a host computer connected to the first and second gaming machines, the host computer including a processor coupled to a database, the player account being stored in the database and including a number of bonus points, including the steps of:

accepting a wager from the player to play either of the first and second games;

establishing, by the host computer processor, a first triggering level of play associated with the first game, the first triggering level of play including a first predetermined amount of credits wagered on the first game;

establishing, by the host computer processor, a second triggering level of play associated with the second game, the second triggering level of play including a second predetermined amount of credits wagered on the second game, the second predetermined amount of credits being different from the first predetermined amount of credits;

tracking, by the host computer processor, play by the player of the first game on the first gaming machine during a first playing session;

tracking, by the host computer processor, play by the player of the second game on the first gaming machine during a second playing session that occurs after the first playing session;

tracking, by the host computer processor, play by the player of the first game on the second gaming machine;

tracking, by the host computer processor, play by the player of the second game on the second gaming machine;

aggregating, by the host computer processor, the level of play by the player of the first game on the first and second gaming machines and storing the aggregated tracked level of play of the first game in the database;

aggregating, by the host computer processor, the level of play by the player of the second game on the first and second gaming machines and storing the aggregated tracked level of play of the second game in the database;

determining, by the host computer processor, if the aggregated tracked level of play of the first game meets the first triggering level within a predetermined period of time;

determining, by the host computer processor, if the aggregated tracked level of play of the second game meets the second triggering level; and, responsively awarding, by the host computer processor, the incentive award to the player if:

(a) the aggregated tracked level of play of the first game meets the first triggering level within the predetermined period of time, (b) the aggregated tracked level of play of the second game meets the second triggering level, and (c) the number of bonus points included in the player account is less than a predefined number of bonus points;

wherein the incentive award includes an amount of bonus points for use in placing a wager on a subsequent play of either of the first and second games.

15. A method, as set forth in claim 14, including the step of allowing a user to set at least one of the first and second triggering levels.

16. A method, as set forth in claim 14, wherein the plurality of games includes a pre-selected game, the method including the step of awarding the incentive award if the first playable game is the pre-selected game.

17. A method, as set forth in claim 16, including the step of awarding the incentive award if the tracked level of play of the second game meets the second triggering level within the predetermined period of time.

18. A method, as set forth in claim 14, including the step of awarding the incentive award if the tracked level of play of the second game meets the second triggering level within a second predetermined period of time.

19. A method, as set forth in claim 18, including the steps of:

assigning the bonus points to a voucher; and assigning the voucher to the player account.

20. A method, as set forth in claim 18, wherein the bonus points are incentive points.

21. A method, as set forth in claim 18, wherein the bonus points are credits.

22. A method, as set forth in claim 18, wherein the bonus points may be converted to credits for use in placing a wager at the first and second gaming machines.

23. A method, as set forth in claim 14, wherein the incentive award may be redeemed for gifts and/or services.

24. A method, as set forth in claim 14, wherein the incentive award is associated with an electronic voucher assigned to the player account.

25. A method, as set forth in claim 14, wherein the first game is played according to a first set of rules and the second game is played according to a second set of rules.

26. A method, as set forth in claim 14, wherein the first game is a different type of game than the second game.

27. A method, as set forth in claim 14, wherein the wager is in the form of credits.

28. A method, as set forth in claim 27, wherein the credits have an associated first cost in the first game and an associated second cost in the second game.

29. A method, as set forth in claim 14, including the steps of:

adding play of the first game at the second gaming machine to the play of the first game at the first gaming machine; and, adding play of the second game at the second gaming machine to the play of the second game at the first gaming machine.

30. A method, as set forth in claim 14, wherein the first triggering level and the second triggering level may be met through play at the first gaming machine and/or play at the second gaming machine.

31. A method, as set forth in claim 14, wherein the first triggering level and the second triggering level may be met through play at the first gaming machine plus play at the second gaming machine.

32. A method, as set forth in claim 14, including the step of awarding the incentive award if the tracked level of play of the second game meets the second triggering level within the predetermined period of time.

33. A method, as set forth in claim 32, including the steps of:

assigning the bonus points to a voucher; and assigning the voucher to the player account.

34. A method, as set forth in claim 32, wherein the bonus points are incentive points.

35. A method, as set forth in claim 32, wherein the bonus points are credits.

36. A method, as set forth in claim 32, wherein the bonus points may be converted to credits for play at one of the first gaming machine and the second gaming machine.

37. A method, as set forth in claim 32, wherein the incentive award may be redeemed for gifts and/or services.

38. A method, as set forth in claim 32, wherein the incentive award is associated with an electronic voucher assigned to the player account.

39. A method, as set forth in claim 32, wherein the first game is played according to a first set of rules and the second game is played according to a second set of rules.

40. A method, as set forth in claim 39, including the step of accepting a wager from the player to play either of the first and second games.

41. A method, as set forth in claim 40, wherein the wager is in the form of credits.

42. A method, as set forth in claim 41, wherein credits have an associated first cost in the first game and an associated second cost in the second game.

43. A system for awarding a player an incentive award, comprising:

a gaming machine playable by the player, the gaming machine including a game controller and a memory device having a plurality of games including first and second playable games being stored on the memory device, the gaming machine controller configured to receive a wager from the player, determine an outcome of a game, and provide a jackpot award to the player as a function of the received wager, a paytable, and the generated outcome;

a host computer coupled to the gaming machine for tracking a player account, the host computer including a processor; and, a database coupled to the processor and configured to store player account data in the player account, the player account including a number of bonus points, the game controller configured to:

allow the player to play the first game during a first playing session;

allow the player to play the second game during a second playing session that occurs after the first playing session;

the host computer processor configured to:

establish a first triggering level of play associated with the first game, the first triggering level of play including a first predetermined amount of credits wagered on the first game;

establish a second triggering level of play associated with the second game, the second triggering level of play including a second predetermined amount of credits wagered on the second game, the second predetermined amount of credits being different from the first predetermined amount of credits;

track play by the player of the first game on the gaming machine and store the tracked level of play of the first game in the database;

track play by the player of the second game on the gaming machine and store the tracked level of play of the second game in the database;

determine if the tracked level of play of the first game meets the first triggering level within a predetermined period of time;

determine if the tracked level of play of the second game meets the second triggering level; and award the incentive award player if:

(a) the tracked level of play of the first game meets the first triggering level within the predetermined period of time, (b) the tracked level of play of the second game meets the second triggering level, and (c) the number of bonus points included in the player account is less than a predefined number of bonus points;

wherein the incentive award includes an amount of bonus points for use in placing a wager on a subsequent play of either of the first and second games.

44. A system, as set forth in claim 43, wherein the plurality of games includes a pre-selected game, the computer configured to award the incentive award if the first playable game is the pre-selected game.

45. A system, as set forth in claim 44, the computer configured to award the incentive award if the tracked level of play of the second game meets the second triggering level within the predetermined period of time.

46. A system, as set forth in claim 43, the computer configured to award the incentive award if the tracked level of play of the second game meets the second triggering level within a second predetermined period of time.

47. A system, as set forth in claim 43, the computer for assigning the bonus points to a voucher and assigning the voucher to the player account.

48. A system, as set forth in claim 47, wherein the bonus points are incentive points.

49. A system, as set forth in claim 47, wherein the bonus points are credits.

50. A system, as set forth in claim 47, wherein the bonus points may be converted to credits for play at the gaming machine.

51. A system, as set forth in claim 43, wherein the incentive award may be redeemed for gifts and/or services.

52. A system, as set forth in claim 43, wherein the incentive award is associated with an electronic voucher assigned to the player account.

53. A system, as set forth in claim 43, wherein the first game is played according to a first set of rules and the second game is played according to a second set of rules.

54. A system, as set forth in claim 43, the first and second gaming machines for accepting a wager from the player to play either of the first and second games.

55. A system, as set forth in claim 54, wherein the wager is in the form of credits.

56. A system, as set forth in claim 54, wherein credits have an associated first cost in the first game and an associated second cost in the second game.

57. A system for awarding an incentive award to a player, comprising:

a first gaming machine playable by the player, first and second playable games being playable on the first gaming machine;

a second gaming machine playable by the player, the first and second playable games being playable on the second gaming machine, each of the first and second gaming machines configured to receive a wager from the player, determine an outcome of a game, and provide a jackpot award to the player as a function of the received wager, a paytable, and the generated outcome;

a host computer coupled to the first and second gaming machines, the host computer including a processor configured to track a player account; and, a database coupled to the processor and configured to store player account data in the player account, the player account including a number of bonus points, the host computer processor configured to:

establish a first triggering level of play associated with the first game, the first triggering level of play including a first predetermined amount of credits wagered on the first game;

establish a second triggering level of play associated with the second game, the second triggering level of play including a second predetermined amount of credits wagered on the second game, the second predetermined amount of credits being different from the first predetermined amount of credits;

track play by the player of the first game on the first gaming machine during a first playing session;

track play by the player of the second game on the first gaming machine during a second playing session that occurs after the first playing session;

track play by the player of the first game on the second gaming machine;

track play by the player of the second game on the second gaming machine;

aggregate the level of play by the player of the first game on the first and second gaming machines and store the aggregated tracked level of play of the first in the database;

aggregate the level of play by the player of the second game on the first and second gaming machines and store the aggregated tracked level of play of the second game in the database;

determine if the aggregated tracked level of play of the first game meets the first triggering level within a predetermined period of time;

determine if the aggregated tracked level of play of the second game meets the second triggering level; and, responsively award the incentive award to the player if:

(a) the aggregated tracked level of play of the first game meets the first triggering level within the predetermined period of time, (b) the aggregated tracked level of play of the second game meets the second triggering level, and (c) the number of bonus points included in the player account is less than a predefined number of bonus points;

wherein the incentive award includes an amount of bonus points for use in placing a wager on a subsequent play of either of the first and second games.

58. A system, as set forth in claim 57, the computer for allowing a user to set the triggering first and second levels.

59. A system, as set forth in claim 57, the computer configured to award the incentive award if the first playable game is the pre-selected game.

60. A system, as set forth in claim 59, the computer configured to award the incentive award if the tracked level of play of the second game meets the second triggering level within a second predetermined period of time.

61. A system, as set forth in claim 57, the computer configured to award the incentive award if the tracked level of play of the second game meets the second triggering level within the predetermined period of time.

62. A system, as set forth in claim 61, the computer for assigning the bonus points to a voucher and assigning the voucher to the player account.

63. A system, as set forth in claim 61, wherein the bonus points are incentive points.

64. A system, as set forth in claim 61, wherein the bonus points are credits.

65. A system, as set forth in claim 61, wherein the bonus points may be converted to credits for play at one of the first gaming machine and the second gaming machine.

66. A system, as set forth in claim 57, wherein the incentive award may be redeemed for gifts and/or services.

67. A system, as set forth in claim 57, wherein the incentive award is associated with an electronic voucher assigned to the player account.

68. A system, as set forth in claim 57, wherein the first game is played according to a first set of rules and the second game is played according to a second set of rules.

69. A system, as set forth in claim 57, the computer for accepting a wager from the player to play either of the first and second games.

70. A system, as set forth in claim 69, wherein the wager is in the form of credits.

71. A system, as set forth in claim 70, wherein credits have an associated first cost in the first game and an associated second cost in the second game.

* * * * *